(12) United States Patent
Nagai et al.

(10) Patent No.: US 7,181,988 B2
(45) Date of Patent: Feb. 27, 2007

(54) ACTUATOR

(75) Inventors: Shigekazu Nagai, Adachi-ku (JP); Akio Saitoh, Kawaguchi (JP); Masaru Saitoh, Mitsukaido (JP)

(73) Assignee: SMC Kabushiki Kaisha, Tokyo (JP)

( * ) Notice: Subject to any disclaimer, the term of this patent is extended or adjusted under 35 U.S.C. 154(b) by 129 days.

(21) Appl. No.: 10/934,478

(22) Filed: Sep. 7, 2004

(65) Prior Publication Data

US 2005/0054468 A1  Mar. 10, 2005

(30) Foreign Application Priority Data

Sep. 9, 2003  (JP) ............................. 2003-316656

(51) Int. Cl.
*F16H 27/02* (2006.01)
*F16H 29/02* (2006.01)

(52) U.S. Cl. ..................... 74/89.22; 74/89.2

(58) Field of Classification Search ............... 74/89.22, 74/89.33, 89.21, 89.32; 474/73, 41, 8, 30, 474/39; 198/816, 813, 588

See application file for complete search history.

(56) References Cited

U.S. PATENT DOCUMENTS

| 765,173 A | * | 7/1904 | Fay | .............................. 474/35 |
| 4,881,633 A | * | 11/1989 | Cailey et al. | ............. 198/345.1 |
| 5,460,059 A | * | 10/1995 | Kato | .......................... 74/89.22 |
| 5,517,872 A | * | 5/1996 | Anada | ........................ 74/89.21 |
| 6,427,546 B2 | * | 8/2002 | Alber | ......................... 74/89.17 |
| 2002/0066327 A1 | | 6/2002 | Nagai et al. | |

FOREIGN PATENT DOCUMENTS

| DE | 40 40 510 | 7/1991 |
| DE | 195 09 871 | 9/1996 |
| EP | 0 322 509 | 7/1989 |
| EP | 0 707 922 | 4/1996 |
| EP | 0 918 174 | 5/1999 |
| EP | 1 327 786 A1 | 7/2003 |
| JP | 2001-248703 | * 9/2001 |
| JP | 2002-174317 | 6/2002 |
| JP | 2003-74551 | 3/2003 |

* cited by examiner

*Primary Examiner*—Richard Ridley
*Assistant Examiner*—James Pilkington
(74) *Attorney, Agent, or Firm*—Paul A. Guss

(57) ABSTRACT

A rotary driving source is connected to one end of a frame. The rotary driving force of the rotary driving source is transmitted to a slider by the aid of a driving pulley, a belt member, and a driven pulley. The slider is displaced in the axial direction of the frame while being guided by a guide mechanism. Each of the frame and the slider is formed of, for example, an aluminum alloy. First guide rails are installed in the frame and second guide rails are installed in side surfaces of the slider. The first guide rails and the second guide rails are formed of a metal material subjected to a hardening treatment.

15 Claims, 12 Drawing Sheets

ACTUATOR

BACKGROUND OF THE INVENTION

1. Field of the Invention

The present invention relates to an actuator, which is capable of reciprocally moving a slider linearly along a frame under a driving action of a driving source.

2. Description of the Related Art

A transport mechanism such as an actuator has been hitherto used, for example, in order to transport a workpiece.

As shown in FIG. 12, the actuator comprises an inner block 2, which is disposed inside an outer rail 1, and which is displaceable in the axial direction. A ball screw 3 is screw-engaged with a substantially central portion of the inner block 2 in the axial direction.

The outer rail 1 comprises a pair of inner wall surfaces 1a, 1b formed so that the pair of inner wall surfaces 1a, 1b are opposed to the inner block 2. A pair of ball-rolling grooves 4a, 4b, which extend in the axial direction, are formed on the inner wall surfaces 1a, 1b. Unillustrated ball grooves are formed on both side surfaces of the inner block 2 opposed to the ball-rolling grooves 4a, 4b. Return passages 7, within which a plurality of balls 6 are circulated, are formed in the inner block 2. The inner block 2 is guided to make displacement along the outer rail 1 by the balls 6, which are allowed to circulate through the return passages 7, the ball-rolling grooves 4a, 4b, and the ball grooves (not shown).

The ball screw 3, which is integrally connected to a driving source such as an unillustrated electric motor, is rotated, and the inner block 2, which is screw-engaged with the ball screw 3, is displaced linearly in the axial direction of the outer rail 1 under rotary action of the ball screw 3 (see, for example, Japanese Laid-Open Patent Publication No. 2003-074551).

The actuator according to Japanese Laid-Open Patent Publication No. 2003-074551 includes a structure in which a plurality of balls 6 are circulated through the return passages 7 in the inner block 2, the ball-rolling grooves 4a, 4b, and the unillustrated ball grooves, when the inner block 2 is displaced along the outer rail 1 under a driving action of the driving source. However, sliding resistance is generated when the balls 6 are circulated through the ball-rolling grooves 4a, 4b and the ball grooves, and thus abrasion occurs on the inner block 2 and the inner wall surfaces 1a, 1b of the outer rail 1.

Therefore, the outer rail 1 formed with the ball-rolling grooves 4a, 4b and the inner block 2 formed with the ball grooves are each formed of a metal material (for example, stainless steel) capable of being subjected to a heat treatment (i.e., hardening treatment), and both the outer rail 1 and the inner block 2 are subjected to such a hardening treatment. Accordingly, abrasion that arises due to sliding action of the balls 6 is suppressed by increasing the hardness of the ball-rolling grooves 4a, 4b and the ball grooves. However, when the hardening treatment is applied to the outer rail 1 and the inner block 2, additional costs are incurred as a result of the heat treatment, and the number of production steps is increased.

On the other hand, in recent years, demands have grown for lightweight actuators and efforts have been made to further reduce the weight of actuators.

SUMMARY OF THE INVENTION

A general object of the present invention is to provide an actuator, which makes it possible to reduce production costs and provide a lightweight actuator, while also suppressing abrasion at the sliding portions of a guide mechanism.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
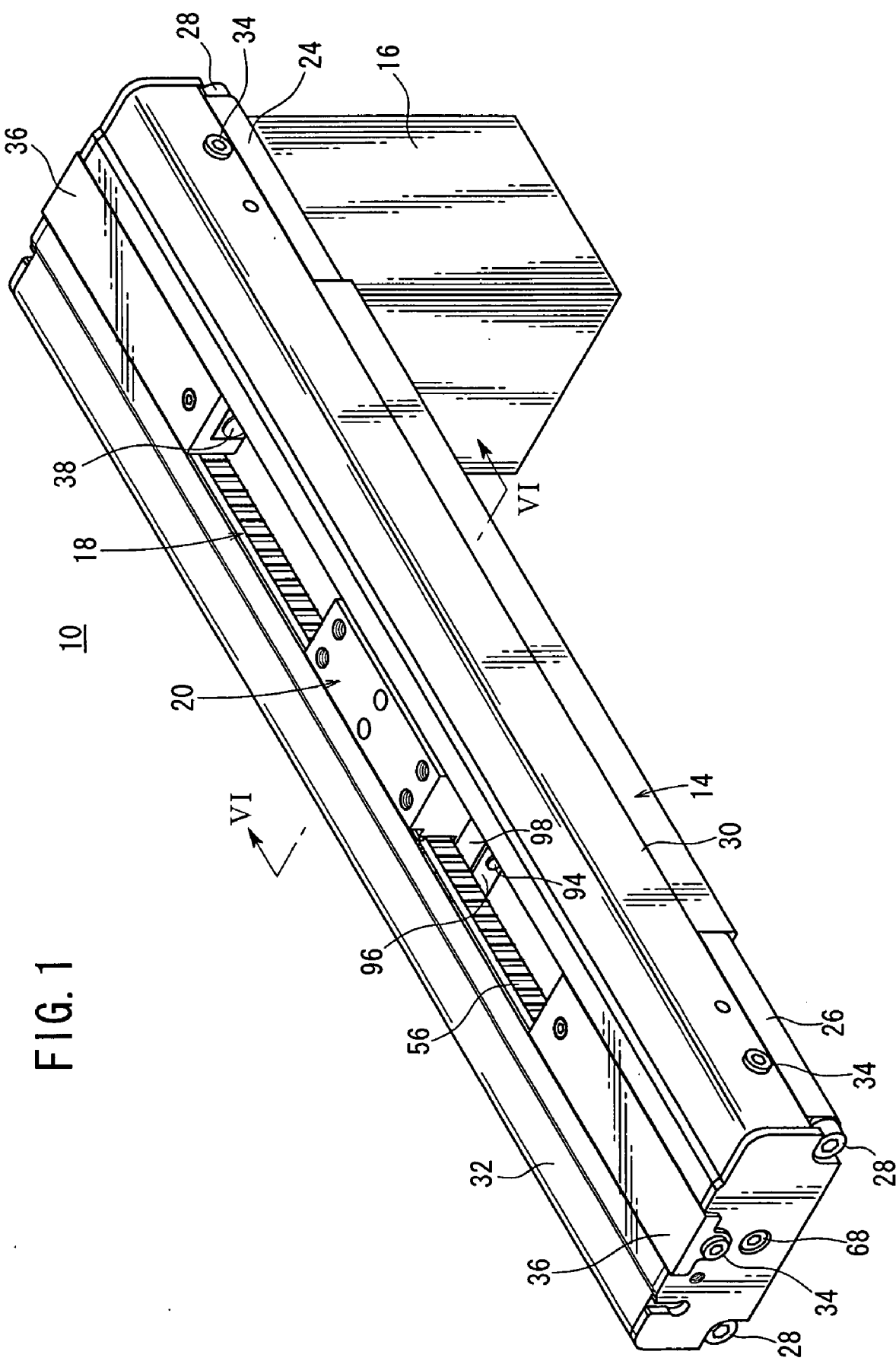
FIG. 1 shows a perspective view illustrating an actuator according to a first embodiment of the present invention.

With reference to FIGS. 1 to 4, reference numeral 10 indicates an actuator according to a first embodiment of the present invention.

The actuator 10 comprises a frame 14 (see FIG. 2) which is formed with a plurality of attachment holes 12 (see FIGS. 2 and 3) and which is integrally formed with a pair of side walls 14b, 14c mutually opposed to a flat plate-shaped bottom wall 14a. A rotary driving source 16 is provided at one end of the frame 14. The actuator 10 further comprises a driving force-transmitting mechanism 18 which converts the rotary driving force of the rotary driving source 16 into rectilinear motion that is transmitted to a slider 20, which is displaceable in the axial direction of the frame 14 in accordance with the rectilinear motion transmitted from the driving force-transmitting mechanism 18, and a guide mechanism 22 which guides the slider 20 in the axial direction of the frame 14.

The frame 14 is integrally formed by applying, for example, an extrusion or drawing process to a light alloy material, a light metal material such as an aluminum alloy, or a lightweight high strength resin material such as carbon fiber reinforced plastics (CFRP) containing carbon fiber. A first housing 24 is integrally connected to one end of the frame 14 in the axial direction by the aid of bolt members 28. A second housing 26 is integrally connected to the other end of the frame 14 in the axial direction by the aid of bolt members 28.

First and second side covers 30 and 32, each of which has a substantially L-shaped cross section, are detachably disposed on upper surfaces of the first housing 24 and the second housing 26 by the aid of screw members 34, so that the first housing 24 and the second housing 26 are connected to one another. The first and second side covers 30, 32 serve to cover the upper surfaces and parts of side surfaces of the first housing 24 and the second housing 26, and also cover an upper portion of the frame 14.

A pair of top covers 36 are detachably installed on upper surfaces of the first housing 24 and the second housing 26 between the first and second side covers 30, 32 by the aid of screw members 34 respectively. That is, upper surfaces of the first and second housings 24, 26 are covered entirely by the top covers 36 and the first and second side covers 30, 32.

Figure 3:
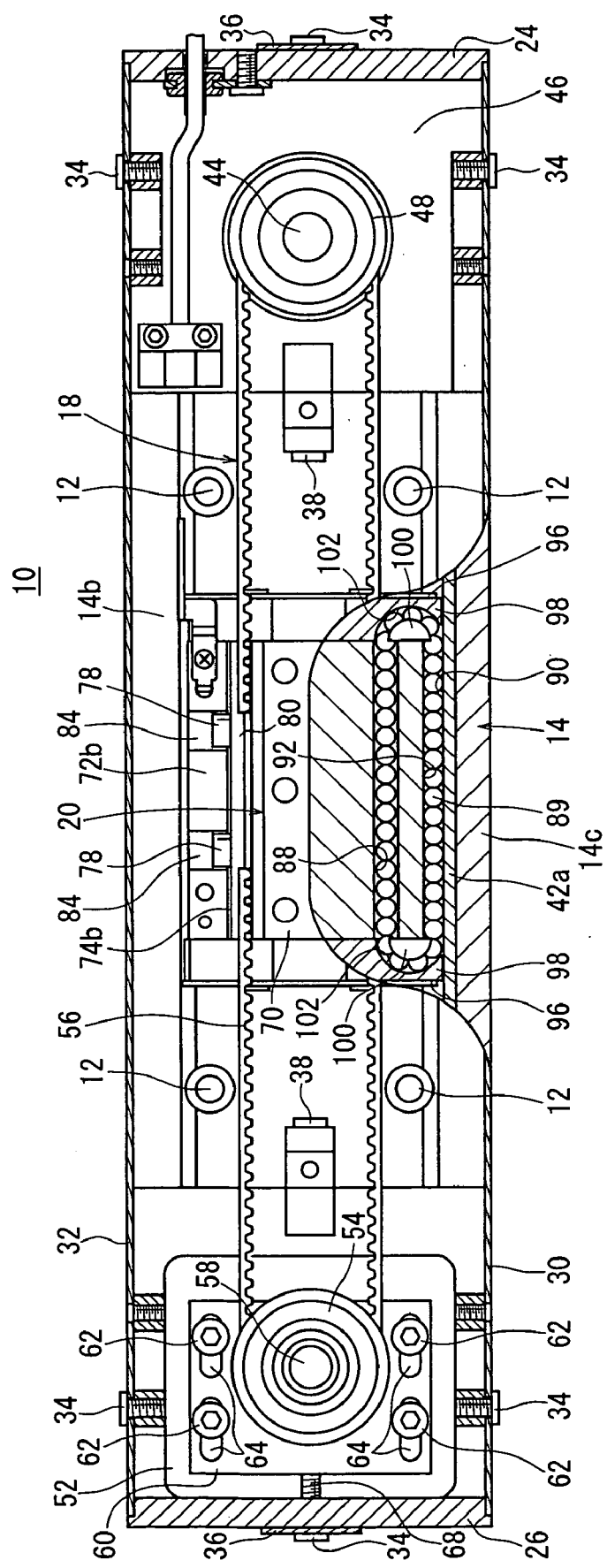
FIG. 3 shows, in partial cross section, a plan view illustrating a state in which a top cover is detached from the actuator shown in FIG. 1.

Stopper members 38, which mitigate shocks that may occur upon displacement and abutment of the slider 20, are provided at respective ends of the first housing 24 and the second housing 26 opposed to the slider 20 (see FIG. 3).

Figure 6:
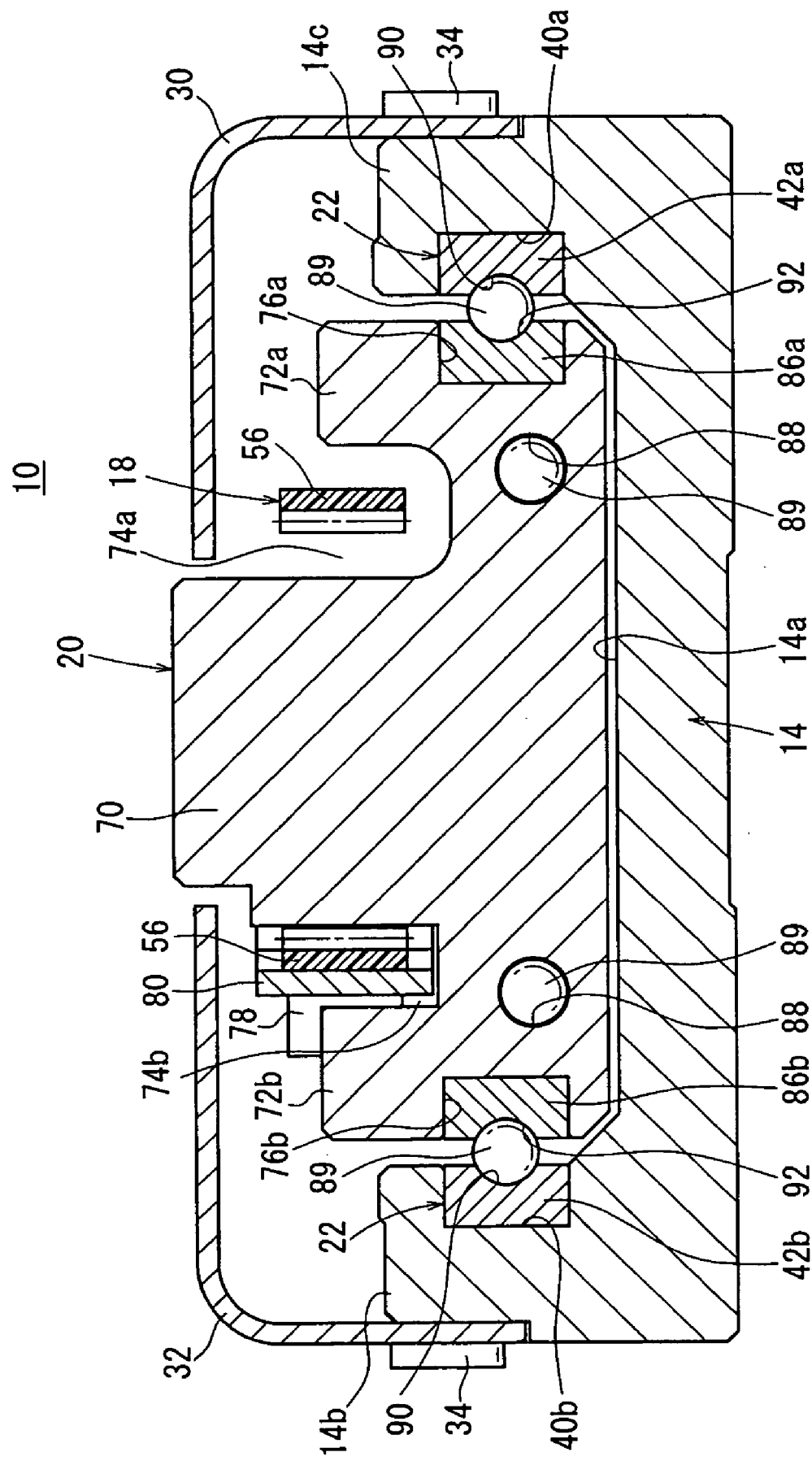
FIG. 6 shows a vertical sectional view taken along line VI—VI in FIG. 1.

As shown in FIG. 6, a pair of first long grooves 40a, 40b, each of which is recessed and has a rectangular cross section, extend in the axial direction along portions of the frame 14 disposed in the vicinity of the bottom surface of the inner wall. Elongate guide rails 42a, 42b, having substantially the same cross-sectional shapes as the first long grooves 40a, 40b, are installed in the first long grooves 40a, 40b. The pair of first long grooves 40a, 40b are formed so that they are opposed to one another on opposite sides of the frame 14.

Figure 4:
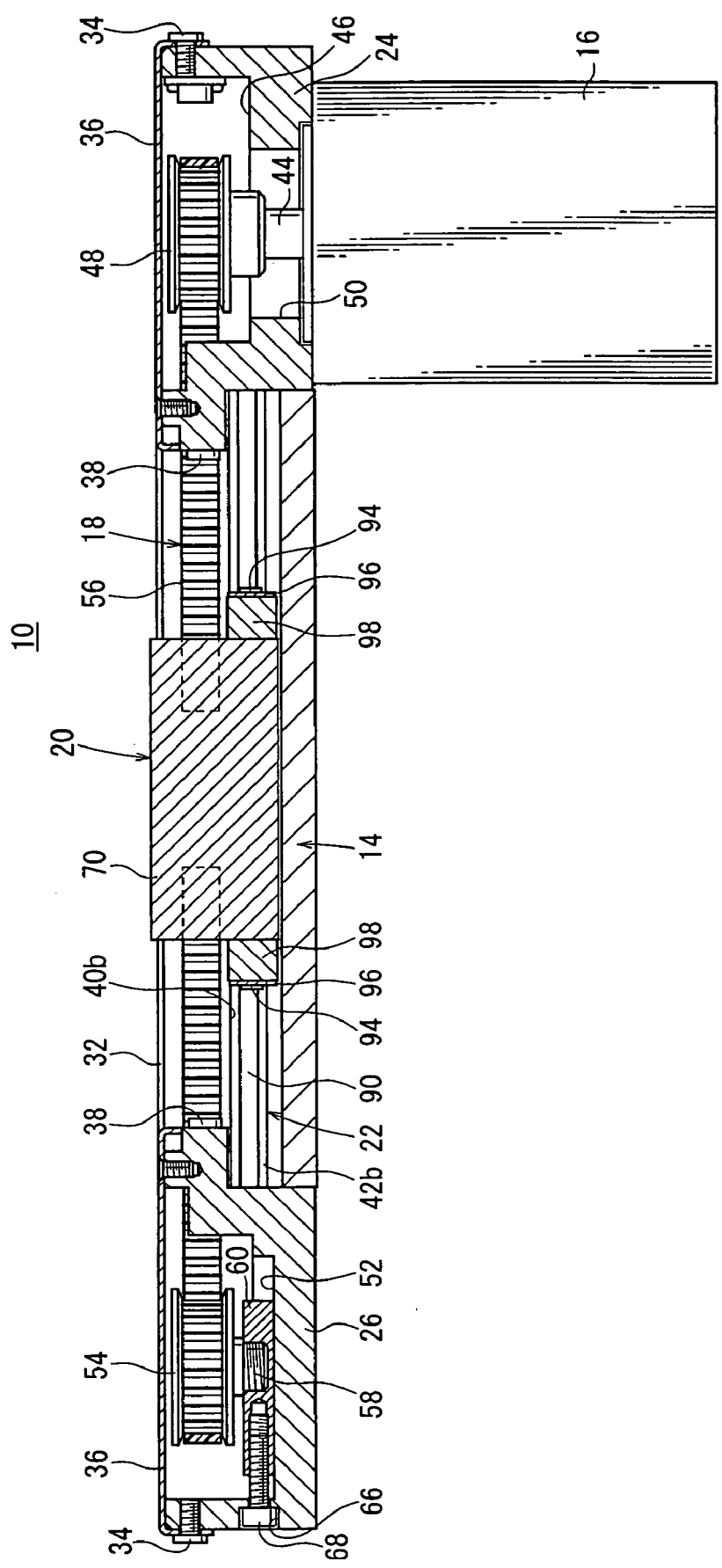
FIG. 4 shows a longitudinal sectional view taken in the axial direction of the actuator shown in FIG. 2.

As shown in FIG. 4, the rotary driving source 16 is connected to a bottom surface portion of the first housing 24 by the aid of unillustrated screw members. A drive shaft 44 of the rotary driving source 16 is connected via an opening 50 to a driving pulley 48, which is arranged in a recess 46 of the first housing 24. The driving pulley 48 is rotatably supported in the recess 46.

The first housing 24, in which the rotary driving source 16 and the driving pulley 48 are provided, functions as a single driving unit (first unit). That is, for example, when the frame 14 is exchanged in order to change the stroke amount of the actuator 10, the operation for exchanging the frame 14 can be conveniently performed simply by assembling the driving unit to an end of another frame. Further, it is possible to use common parts, because the driving unit can be utilized as is.

On the other hand, a driven pulley 54 is rotatably supported in a recess 52 formed in the second housing 26. A belt member 56, which extends substantially in parallel to the frame 14, runs annularly over the driving pulley 48 and the driven pulley 54. That is, the driving pulley 48, the driven pulley 54, and the belt member 56 function as the driving force-transmitting mechanism 18 for transmitting rotary driving force of the rotary driving source 16 to the slider 20, which is connected to the belt member 56.

The second housing 26, in which the driven pulley 54 is provided, functions as a single driven unit (second unit). That is, for example, when the frame 14 is exchanged in order to change the stroke amount of the actuator 10, the operation for exchanging the frame 14 can be conveniently performed simply by assembling the driven unit to an end of another frame. Further, it is possible to use common parts, because the driven unit can be utilized as is.

A columnar pulley shaft 58 is inserted into a substantially central portion of the driven pulley 54 by the aid of a plurality of bearings. The pulley shaft 58 is fixed by threaded engagement with an adjusting plate 60, which is installed in the recess 52 of the second housing 26. As shown in FIG. 3, the adjusting plate 60 is fastened in the recess 52 of the second housing 26 in a direction substantially perpendicular to the axis by the aid of screw members 62. Further, the adjusting plate 60 is disposed so as to be displaceable along a plurality of long holes 64 with which the screw members 62 are engaged, i.e., in the axial direction of the second housing 26.

An adjusting screw 68 is screw-engaged with the adjusting plate 60 via a hole 66 that penetrates through the second housing 26. The head of the adjusting screw 68 is accommodated in the hole 66, and hence the head does not protrude from the end surface of the second housing 26 (see FIG. 4).

When the adjusting screw 68 is turned, the adjusting plate 60 is displaced in the axial direction of the frame 14. Therefore, the driven pulley 54, which is fixed to the adjusting plate 60, can be integrally displaced. Accordingly, it is possible to adjust the tension of the belt member 56 that runs over the driving pulley 48 and the driven pulley 54. That is, for example, when the adjusting screw 68 is turned from the outside by the aid of, for example, a hexagon wrench, to adjust the degree of threaded engagement with respect to the adjusting plate 60, the adjusting plate 60 is displaced by a minute distance in the recess 52 of the second housing 26 along the long holes 64 through which the screw members 62 engage with the adjusting plate 60. Thus, it is possible to optimally adjust the tension of the belt member 56.

As shown in FIG. 6, the slider 20 is composed of a light alloy material, a light metal material such as an aluminum alloy, or a lightweight high strength resin material such as carbon fiber reinforced plastics (CFRP) containing carbon fiber, in the same manner as the frame 14. The slider 20 is disposed so as to be displaceable in the axial direction inside the frame 14.

The slider 20 comprises a main body section 70, disposed substantially centrally and which protrudes slightly upwardly between the first side cover 30 and the second side cover 32, a pair of flange sections 72a, 72b that are separated from each other by a predetermined spacing distance on both sides of the main body section 70, and space sections 74a, 74b formed between the main body section 70 and the flange sections 72a, 72b respectively. A table or the like, on which a workpiece is placed by the aid of unillustrated screws or the like, is installed on an upper surface of the main body section 70.

Flange sections 72a, 72b are formed with a smaller dimension in the height direction as compared with the main body section 70. Second long grooves 76a, 76b, which have rectangular cross sections are recessed at a predetermined depth respectively, extending in the axial direction along both side surfaces of the slider 20 opposed to the frame 14. The second long grooves 76a, 76b are formed at positions opposed to the first long grooves 40a, 40b formed in the frame 14 respectively.

Space sections 74a, 74b are formed between the main body section 70 and the flange sections 72a, 72b and are recessed downwardly at a predetermined depth from upper surfaces of the flange sections 72a, 72b. As shown in FIGS. 3 and 6, a plate-shaped belt stopper 80 is installed by bolts 78 on one side surface of the main body section 70 in the axial direction. Both ends of the belt member 56 are interposed between one side surface of the main body section 70 and the belt stopper 80 (see FIG. 3). Therefore, the belt member 56 is fixed to the slider 20, and thus the slider 20 and the belt member 56 are displaced in an integrated manner.

In this arrangement, as shown in FIG. 3, a pair of depressions 84, which have substantially semicircular cross sections, are formed at positions opposed to bolt holes 82 of the belt stopper 80. Therefore, when the belt stopper 80 is fixed to the slider 20, the heads of the bolts 78 are accommodated within the depressions 84, and the heads do not protrude from a side surface of the slider 20.

On the other hand, the belt member 56, which runs over the driving pulley 48 and the driven pulley 54, passes freely through the space section 74a between the flange section 72a and the other side surface of the main body section 70 (see FIG. 6).

As shown in FIG. 6, the guide mechanism 22 comprises the pair of first guide rails 42a, 42b which are installed along the first long grooves 40a, 40b of the frame 14 respectively, a pair of second guide rails 86a, 86b which are installed along the second long grooves 76a, 76b on side surfaces of the slider 20, and a pair of ball-rolling holes 88 which are disposed proximately to the second guide rails 86a, 86b and which penetrate through the inside of the slider 20 in the axial direction. The first guide rails 42a, 42b and the second guide rails 86a, 86b are arranged at mutually opposed positions.

Each of the first guide rails 42a, 42b and the second guide rails 86a, 86b comprises a prism-shaped member composed of a metal material capable of being subjected to a hardening treatment (hereinafter referred to as "hardened steel"). First ball-rolling grooves 90 having substantially circular arc-shaped cross sections, in which balls 89 roll, extend in the axial direction on side surfaces of the first guide rails 42a, 42b opposed to the second guide rails 86a, 86b. On the other hand, second ball-rolling grooves 92 having substantially circular arc-shaped cross sections, in which balls 89 roll, extend in the axial direction on side surfaces of the second guide rails 86a, 86b opposed to the first guide rails 42a, 42b.

Any one of methods including, for example, adhesion, forcible insertion and fitting, and welding may be used for installing the first guide rails 42a, 42b and the second guide rails 86a, 86b into the first and second long grooves 40a, 40b, 76a, 76b respectively.

Figure 2:
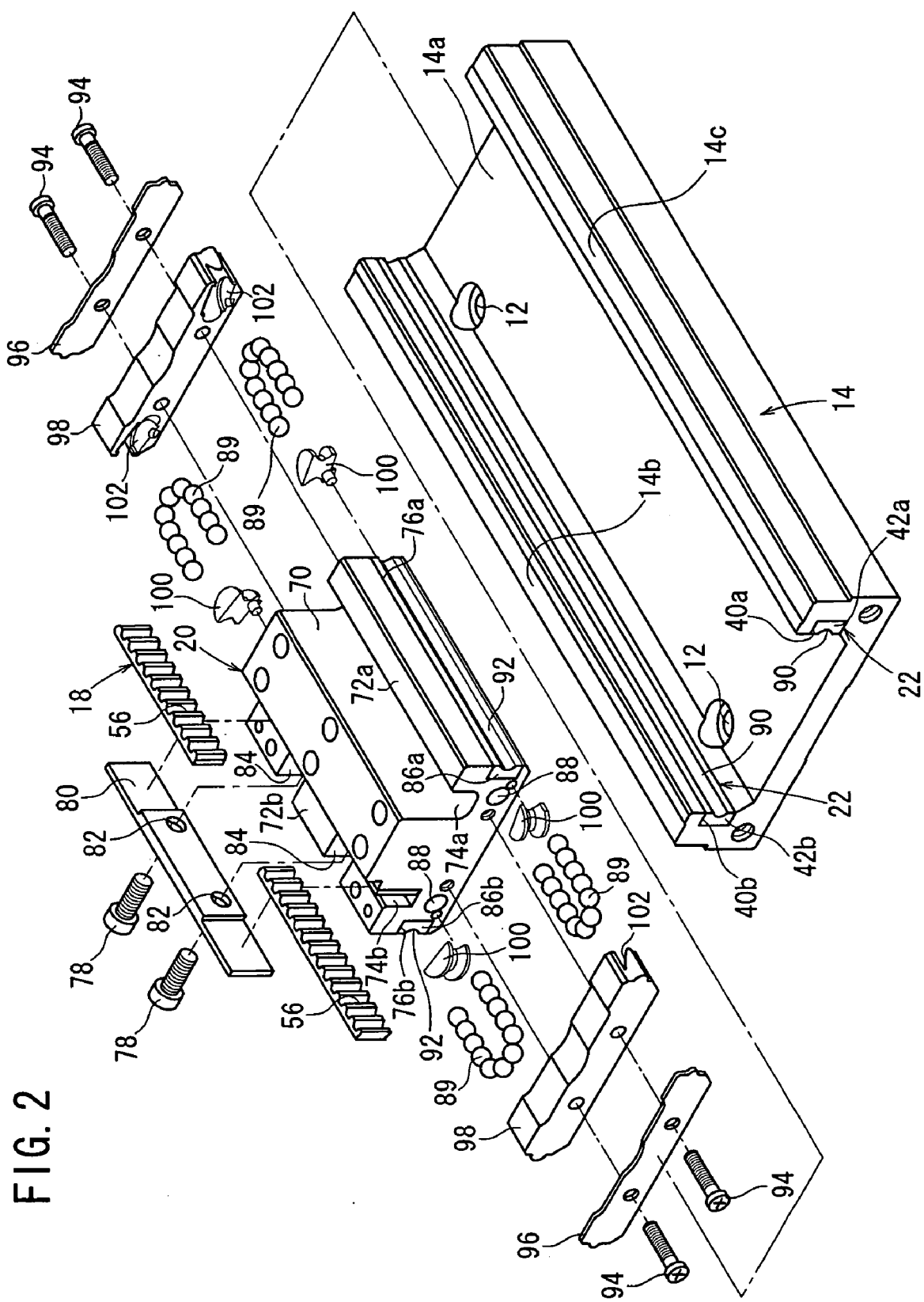
FIG. 2 shows, with partial omission, an exploded perspective view illustrating the actuator shown in FIG. 1.

As shown in FIG. 2, the guide mechanism 22 includes a pair of plates 96 and covers 98 integrally connected to lower portions of the slider 20 by the aid of screw members 94, and return guides 100 installed to the side surfaces of the slider 20. It is preferable that each of the plate 96, the cover 98, and the return guide 100 is formed of a resin material. The plate 96, the cover 98, and the return guide 100, which are disposed on one side surface of the slider 20, are constructed by the same constitutive parts as those disposed on the other side surface.

Covers 98 include therein ball-rolling grooves 102, which are formed on end surfaces thereof and make abutment against the slider 20. In this arrangement, annular endless circulating tracks, which allow the plurality of balls 89 to roll therein, are constructed by the first ball-rolling grooves 90 of the first guide rails 42a, 42b, the second ball-rolling grooves 92 of the second guide rails 86a, 86b, the ball-rolling holes 88 penetrating through the slider 20, and the ball-rolling grooves 102.

Figure 5:
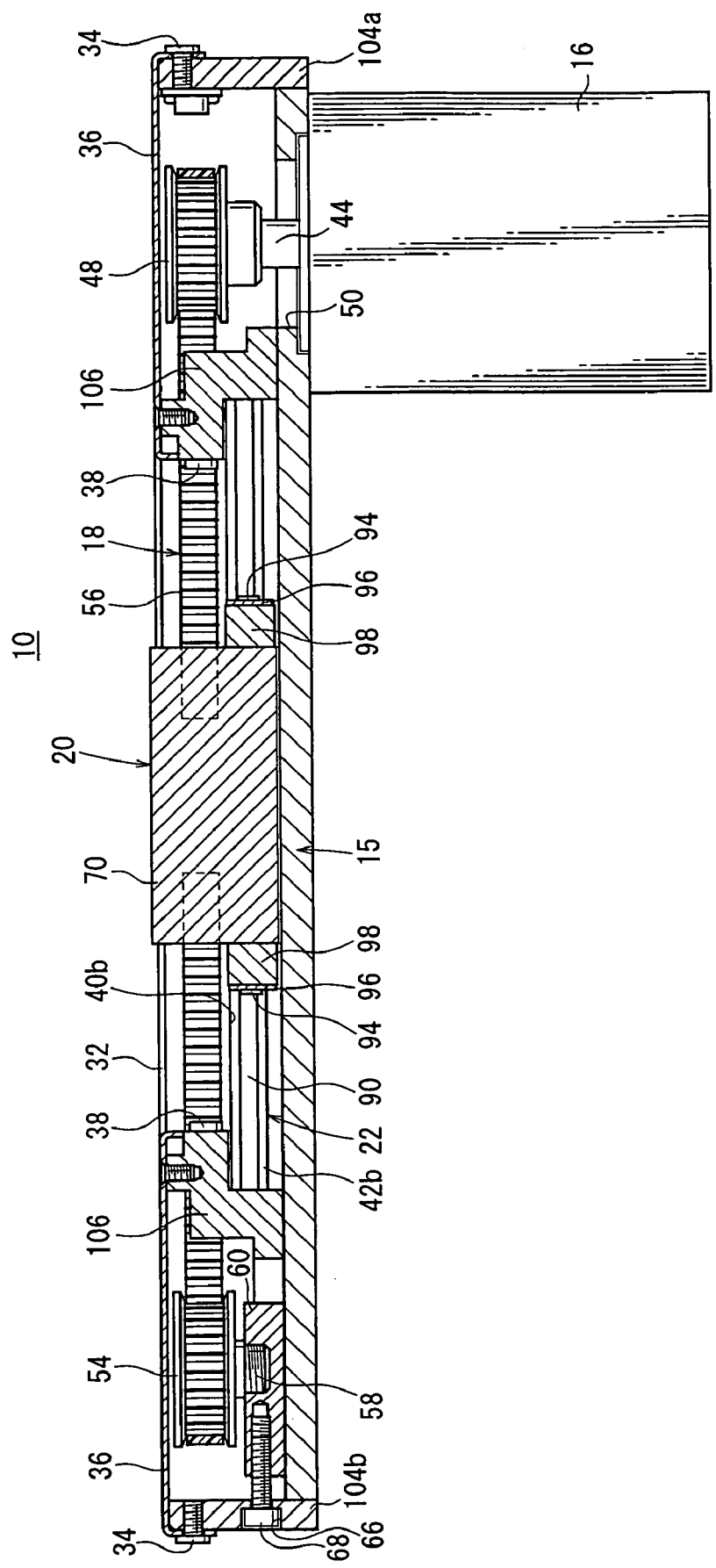
FIG. 5 shows a longitudinal sectional view taken in the axial direction illustrating a case in which first and second housings and a frame of the actuator shown in FIG. 1 are formed in an integrated manner.

The frame 14, the first housing 24, and the second housing 26 of the actuator 10 shown in FIG. 4 alternatively may be formed in an integrated manner, so that the driving pulley 48, the driven pulley 54, and the slider 20 are retained respectively within a single frame 15, as shown in FIG. 5. In this arrangement, end plates 104a, 104b are installed on both ends of the frame 15 respectively, wherein the end plates 104a, 104b are substantially perpendicular to the axis of the frame 15. A pair of retaining blocks 106, each provided with stopper members 38, are provided on the upper surface of the frame 15. The stopper members 38 oppose end surfaces of the slider 20.

Accordingly, it is possible to reduce the number of parts, by forming the frame 15 of the actuator 10 with an integrated shape. Therefore, the time required to produce the actuator 10 can be shortened, while also reducing production costs.

The actuator 10 according to the first embodiment of the present invention is basically constructed as described above. Next, its operations, functions and effects shall be explained.

When current is supplied from an unillustrated power source to the rotary driving source 16, the drive shaft 44 is rotated under rotary action of the rotary driving source 16, and a rotary driving force of the driving pulley 48 connected to the drive shaft 44 is transmitted to the belt member 56 that runs over the driving pulley 48 and the driven pulley 54. The slider 20, to which both ends of the belt member 56 are fixed, is displaced in the axial direction of the frame 14 in an integrated manner while being guided by the guide mechanism 22. When the polarity of the current supplied to the rotary driving source 16 is reversed, under the control action of an unillustrated controller, the direction of displacement of the slider 20 can be reversed to move the slider 20 reciprocally in the axial direction of the frame 14.

As the slider 20 moves reciprocally in the axial direction of the frame 14, the plurality of balls 89 roll along the first ball-rolling grooves 90 and the second ball-rolling grooves 92. Accordingly, the slider 20 is displaced smoothly along the frame 14.

As described above, in the first embodiment, the first guide rails 42a, 42b, which have first ball-rolling grooves 90 formed therein for allowing the plurality of balls 89 to roll, and the second guide rails 86a, 86b, which have second ball-rolling grooves 92 formed therein, are each constructed separately from the frame 14 and the slider 20. The first and second guide rails 42a, 42b and 86a, 86b, in which the first ball-rolling grooves 90 and the second ball-rolling grooves 92 are formed, are produced from hardened steel that is capable of being subjected to a hardening treatment. Accordingly, the frame 14 and the slider 20, which occupy the major portion of the volume of the actuator 10, can be formed, for example, from aluminum alloys and carbon fiber reinforced plastics. Therefore, it is possible to greatly reduce the weight of the actuator 10 overall, thereby realizing a lightweight actuator.

Each of the first guide rails 42a, 42b and the second guide rails 86a, 86b is formed of a metal material, which has been subjected to a heat treatment for hardening the metal material. Therefore, it is possible to suppress and minimize abrasion of the first guide rails 42a, 42b and the second guide rails 86a, 86b, which would otherwise be caused by sliding movement when the balls 89 roll therein.

As a result, it is sufficient to increase the strength of the actuator by applying a hardening treatment only to the first guide rails 42a, 42b and the second guide rails 86a, 86b in which the balls 89 roll, in contrast to the conventional technique, in which strength is improved by applying a heat treatment to the entirety of the frame 14 and slider 20 overall. Therefore, the costs required for performing the heat treatment can be reduced.

On the other hand, alternatively, when the frame 14 and the slider 20 each is formed of a metal material such as a general structural purpose carbon steel (SS material) that is used as a raw material without applying a heat treatment (e.g., a hardening treatment) thereto, in place of the aluminum alloy or the carbon fiber reinforced plastic discussed above, it is also possible to reduce costs, because it is unnecessary to perform a heat treatment such as hardening, as compared to the conventional case in which a hardened steel such as stainless steel is used.

The rigidity of the materials are substantially equivalent, whether a hardened steel, such as stainless steel capable of being hardened, is used, or a non-hardened steel, such as a general structural purpose carbon steel for which heat treatment is unnecessary, is used. Therefore, since heat treatment is unnecessary, when a non-hardened steel is used in place of hardened steel for the frame 14 in an actuator having a long stroke, i.e., in which the displacement amount of the slider 20 is large in the axial direction and wherein the length of the frame 14 in the axial direction is long, it is possible to reduce costs while maintaining rigidity and strength which are substantially equivalent to that of hardened steel.

The coefficient of linear expansion, which indicates a temperature dependent rate of strain, is also substantially equivalent between hardened steel (for example, stainless steel) and non-hardened steel (for example, general structural purpose carbon steel). Therefore, the respective rates of strain are substantially identical, when the first and second guide rails 42*a*, 42*b* and 86*a*, 86*b* formed from hardened steel, and the frame 14 and the slider 20 formed from non-hardened steel, are subjected to changes in temperature.

As a result, change in the clearance between the first guide rails 42*a*, 42*b* and the second guide rails 86*a*, 86*b* of the guide mechanism 22 can be suppressed, and hence the clearance is maintained to be substantially constant. Therefore, it is possible to smoothly displace the slider 20 in the axial direction.

Figure 7:
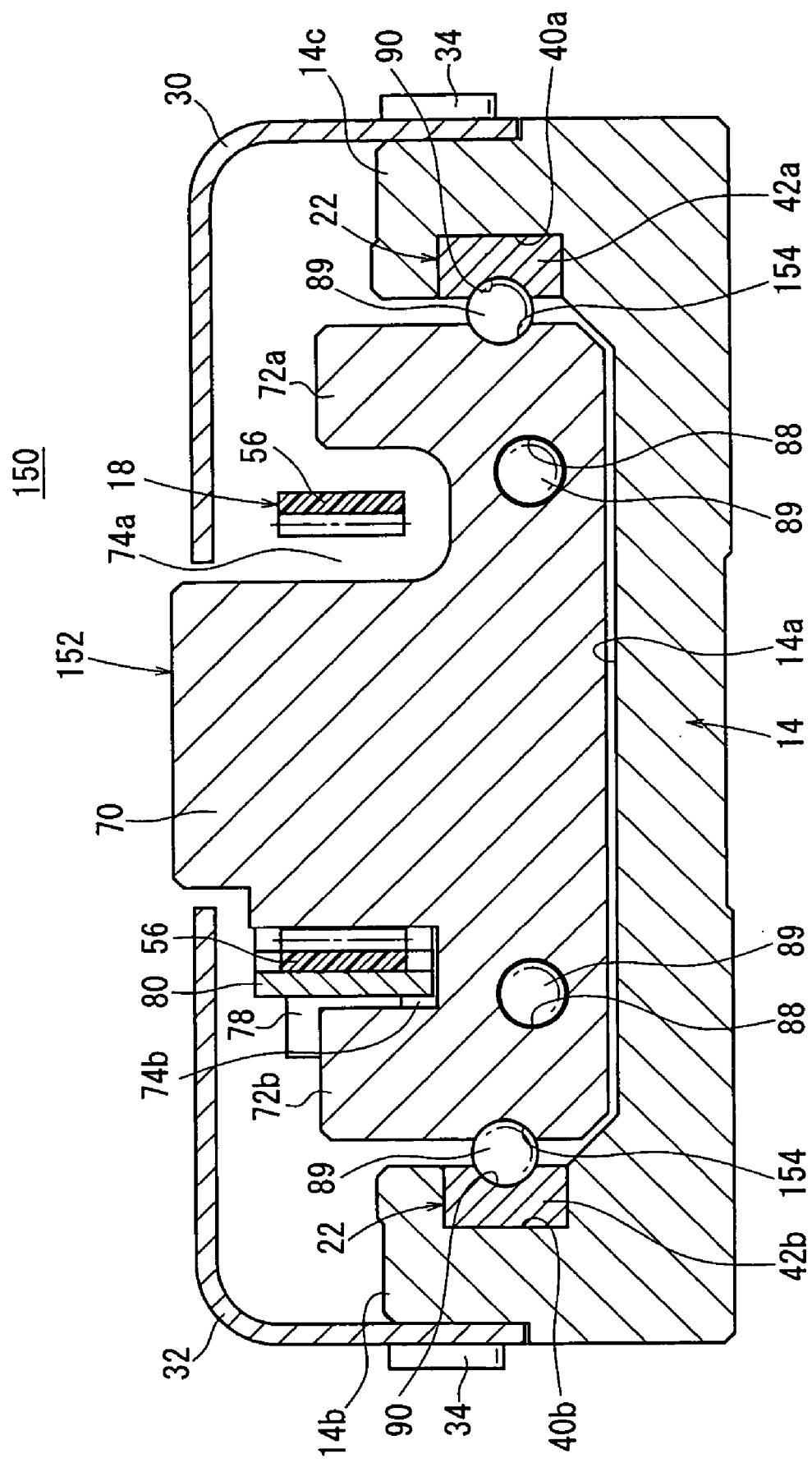
FIG. 7 shows a vertical sectional view illustrating a modified embodiment of the actuator according to the first embodiment of the present invention.
Figure 8:
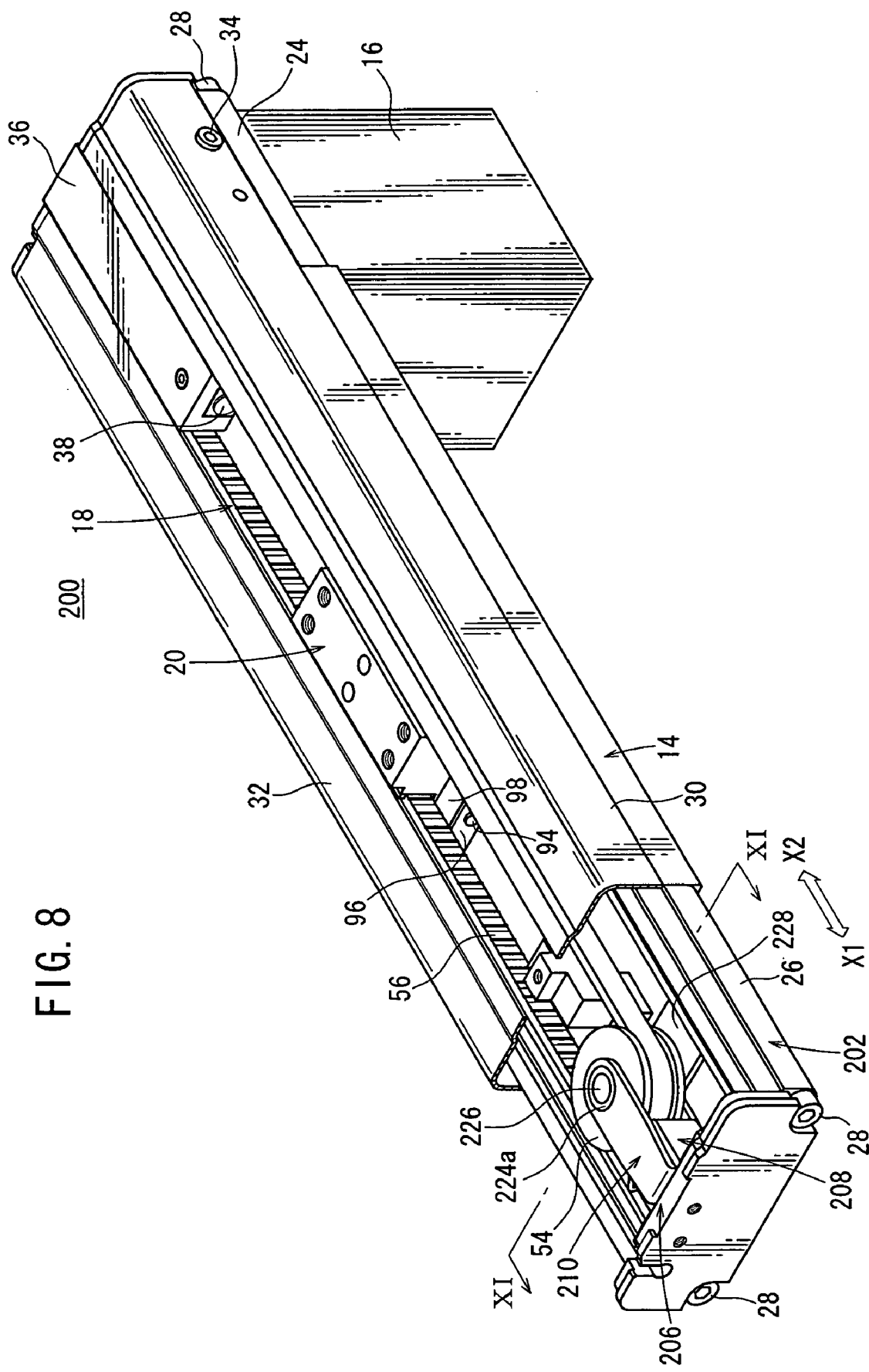
FIG. 8 shows a partial cutout perspective view illustrating an actuator according to a second embodiment of the present invention.

FIG. 7 shows a modified embodiment of the actuator according to the first embodiment. In the following description, the same constitutive components as those of the actuator 10 according to the first embodiment described above are designated by the same reference numerals and detailed explanation thereof shall be omitted.

In the actuator 150 according to this modified embodiment, second ball-rolling grooves 154*a*, 154*b*, which have a substantially circular arc-shaped cross section for allowing the balls 89 to roll therein, are formed on both side surfaces of a slider 152 opposed to the first guide rails 42*a*, 42*b*, which are installed in the first long grooves 40*a*, 40*b* of the frame 14. In other words, the second ball-rolling grooves 154*a*, 154*b*, which extend in the axial direction, are directly machined and formed in both side surfaces of the slider 152.

The second ball-rolling grooves 154*a*, 154*b* are formed as a pair at positions opposed to the first ball-rolling grooves 90 of the first guide rails 42*a*, 42*b*. The balls 89 roll between the first ball-rolling grooves 90 and the second ball-rolling grooves 154*a*, 154*b*. In this arrangement, it is preferable for the slider 152 to be formed from a hardened steel (for example, stainless steel), which is subjected to a hardening treatment, whereas the frame 14 is formed from a light-weight material or a light alloy material such as aluminum alloys, a lightweight high strength resin such as carbon fiber reinforced plastics, or a non-hardened steel such as a general structural purpose carbon steel.

That is, when the pair of second ball-rolling grooves 154*a*, 154*b* are directly formed on both side surfaces of the slider 152, it is possible to shorten time required for installing the second guide rails 86*a*, 86*b* to the slider 20, as compared to the case when the slider 20 and the second guide rails 86*a*, 86*b* are formed as separate members, as in the actuator 10 according to the first embodiment.

Even when the frame 14 is formed from a non-hardened steel, such as a general purpose carbon steel, when the frame 14 and the slider 152 are deformed respectively due to temperature change, the rate of strain is substantially identical because the slider 152 is formed from a hardened steel having substantially the same coefficient of linear expansion as that of non-hardened steel.

As a result, when a temperature change arises in the environment of use of the actuator 150, a substantially constant clearance is maintained without change between the first ball-rolling grooves 90 and the second ball-rolling grooves 154*a*, 154*b* of the slider 152. Therefore, the slider 152 can be smoothly displaced in the axial direction.

Next, an actuator 200 according to a second embodiment is shown in FIGS. 8 to 11. In the following description, the same constitutive components of the actuator 10 according to the first embodiment described above are designated using the same reference numerals, and detailed explanation thereof shall be omitted.

The actuator 200 according to the second embodiment differs from the actuator 10 according to the first embodiment in that a driven unit 202, including the driven pulley 54, is provided with a tension-adjusting mechanism 206. The tension-adjusting mechanism 206 is capable of automatically adjusting the tension of the belt member 56, so that the tension thereof maintains a desired constant tension by the aid of a coil spring (spring member) 204.

A single elongate frame 15 may be provided for the actuator 200, in place of the first and second housings 24, 26, in the same manner as in the actuator 10 of the first embodiment shown in FIG. 5. Accordingly, it is unnecessary to provide the first and second housings 24, 26, and therefore, it is possible to reduce the cost and the number of parts that make up the actuator 200.

The tension-adjusting mechanism 206 of the actuator 200 comprises a retaining bracket 208, which is fixed to an inner wall surface 207 of the second housing 26, a pulley holder 210 retained by the retaining bracket 208 and which rotatably supports the driven pulley 54, and a coil spring 204 which is interposed between the retaining bracket 208 and the pulley holder 210.

Figure 9:
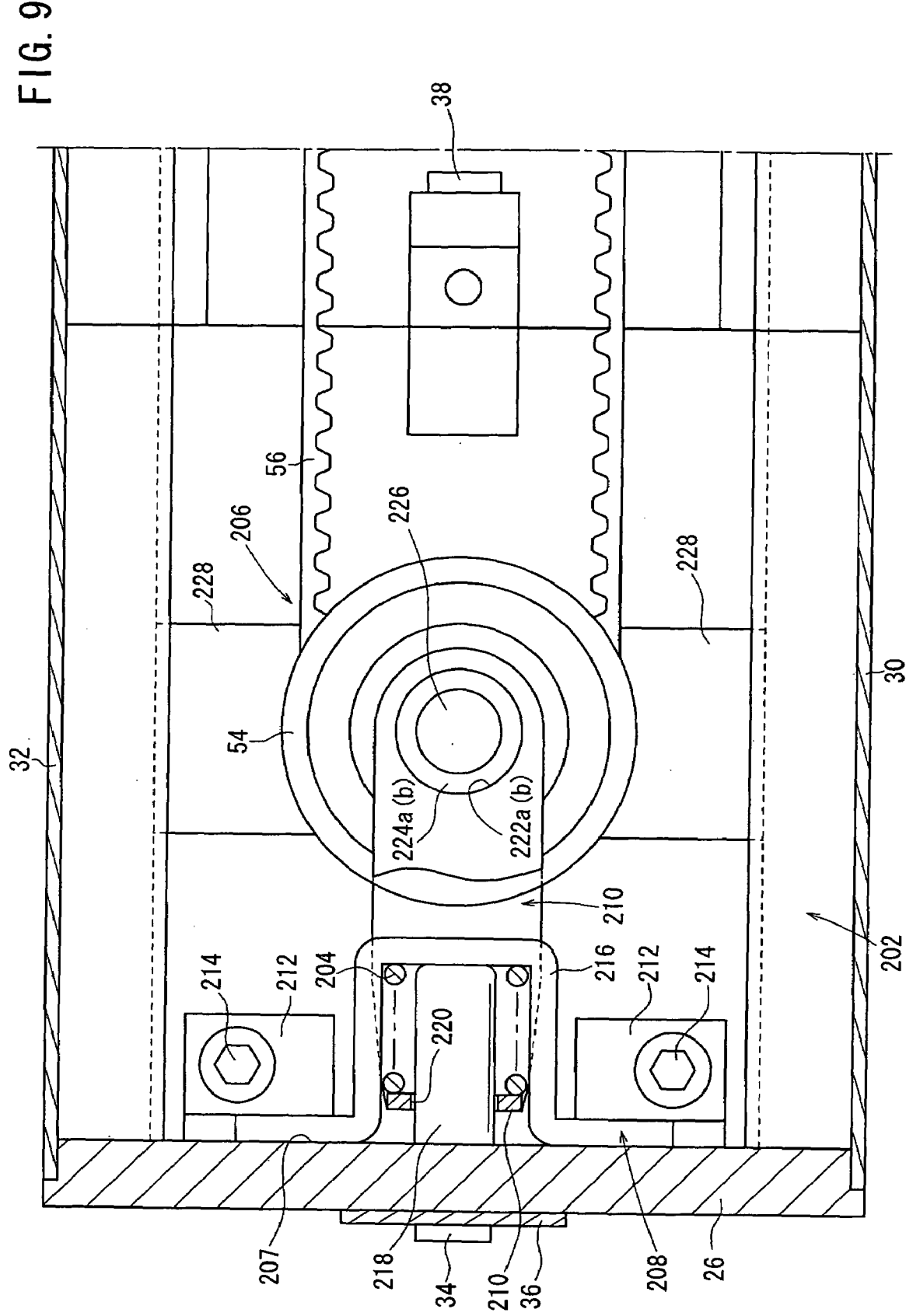
FIG. 9 shows a partial magnified plan view illustrating a state in which a top cover is detached from the actuator shown in FIG. 8.

The retaining bracket 208 may be formed, for example, by pressing (press working) a thin plate member composed of a metal material. The retaining bracket 208 is fixed by bolts 214 and attachment flanges 212 which are formed along the inner wall surface 207 and the bottom surface of the second housing 26. As shown in FIG. 9, the retaining bracket 208 is formed with a projection 216 protruding toward the driven pulley 54 having a substantially U-shaped cross section. A columnar spring guide 218, which is fixed to the inner wall surface 207 of the second housing 26, is arranged within the projection 216. The end surface of the spring guide 218 abuts against the inner wall surface of the projection 216.

Figure 10:
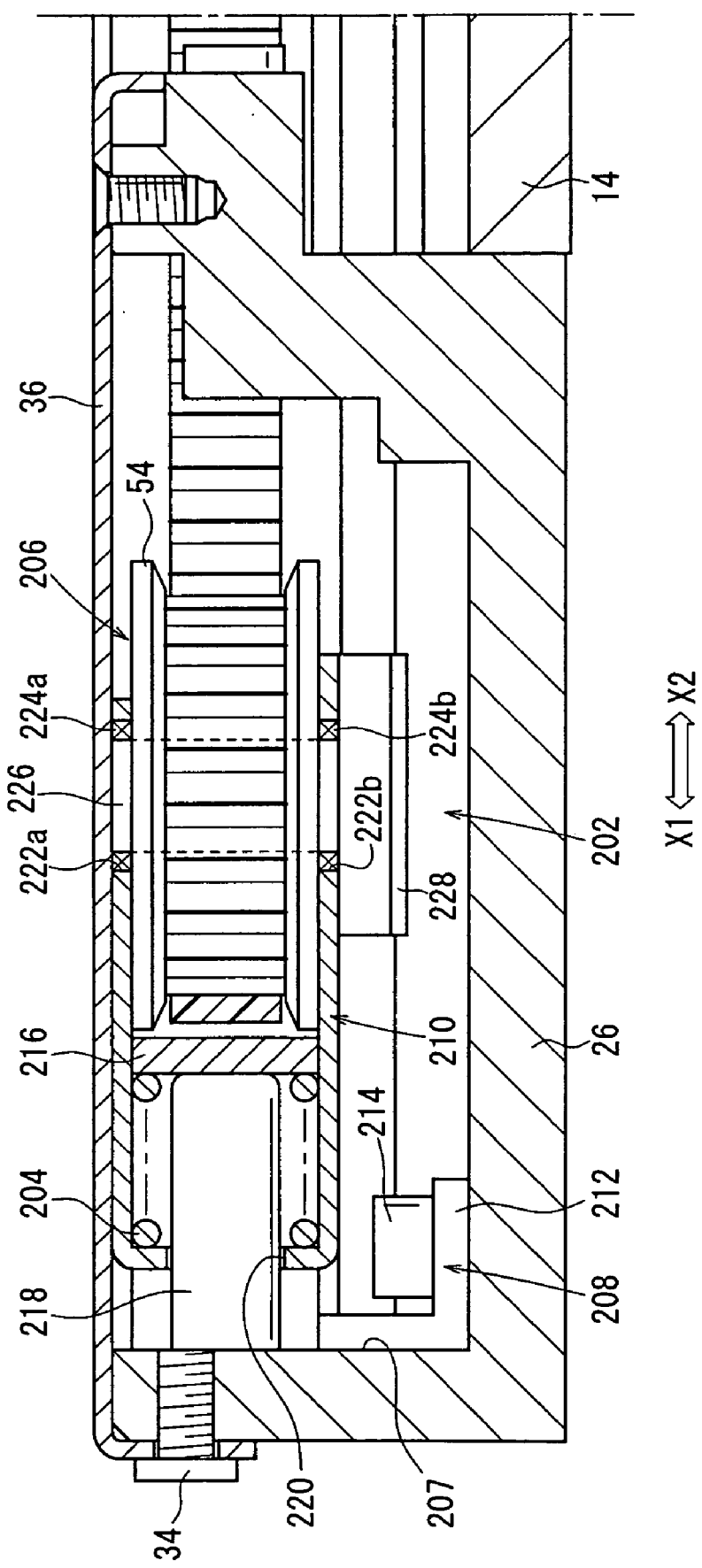
FIG. 10 shows a partial magnified longitudinal sectional view taken in the axial direction illustrating structural features disposed in the vicinity of a driven unit of the actuator shown in FIG. 8.

As shown in FIG. 10, the pulley holder 210 has a substantially U-shaped cross section formed, for example, by press working a thin plate member composed of a metal material. The spring guide 218 of the retaining bracket 208 is inserted into one end thereof via an insertion hole 220. A pair of bearing holes 222*a*, 222*b* are formed at the other open end of the pulley holder 210, in a direction substantially perpendicular to the axis of the spring guide 218. Bearings 224a, 224b are installed into the bearing holes 222a, 222b respectively, and a columnar pulley shaft 226 is inserted into the bearings 224a, 224b so that the driven pulley 54 is retained by the pulley shaft 226. Accordingly, the driven pulley 54 is supported on the other end side of the pulley holder 210. In this arrangement, the driven pulley 54 is retained by the pulley holder 210 via the pair of bearings 224a, 224b through which the pulley shaft 226 is rotatably supported.

The coil spring 204 is interposed in a predetermined compressed state between the bottom-equipped one end of the pulley holder 210 and the inner wall surface of the projection 216. The coil spring 204 is arranged while leaving a certain clearance between the inner wall surface of the projection 216 and the outer circumferential surface of the spring guide 218. The coil spring 204 continuously urges the pulley holder 210 in a direction toward the inner wall surface 207 of the second housing 26 (in the direction of the arrow X1). A plate-shaped plate spring may be used, for example, in place of the coil spring 204. That is, it is acceptable to use any other repulsive member, so long as it provides a sufficient repulsive force for urging the pulley holder 210 in the direction toward the inner wall surface 207 of the second housing 26 (in the direction of the arrow X1).

Figure 11:
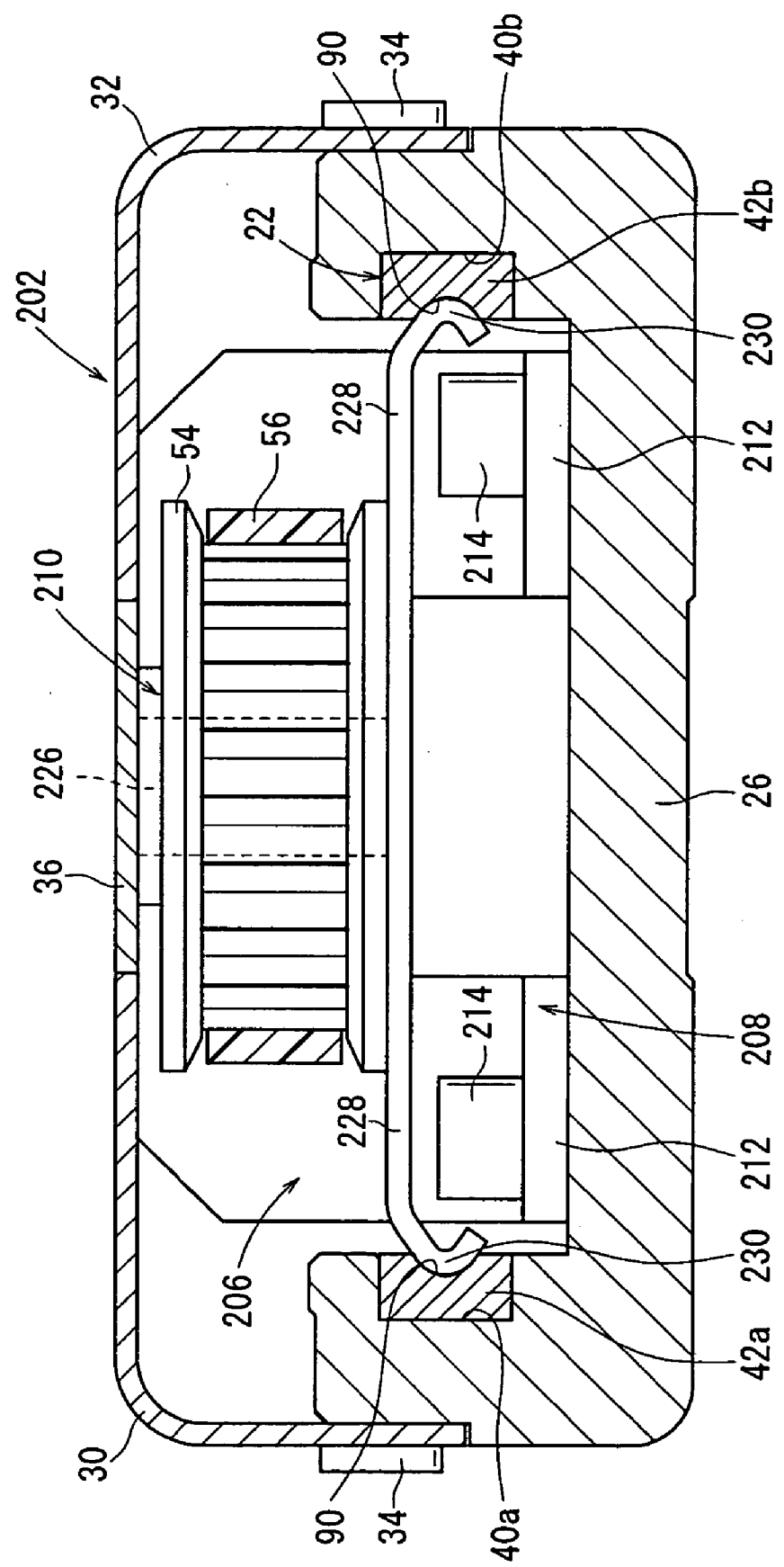
FIG. 11 shows a vertical sectional view taken along line XI—XI in FIG. 8.
Figure 12:
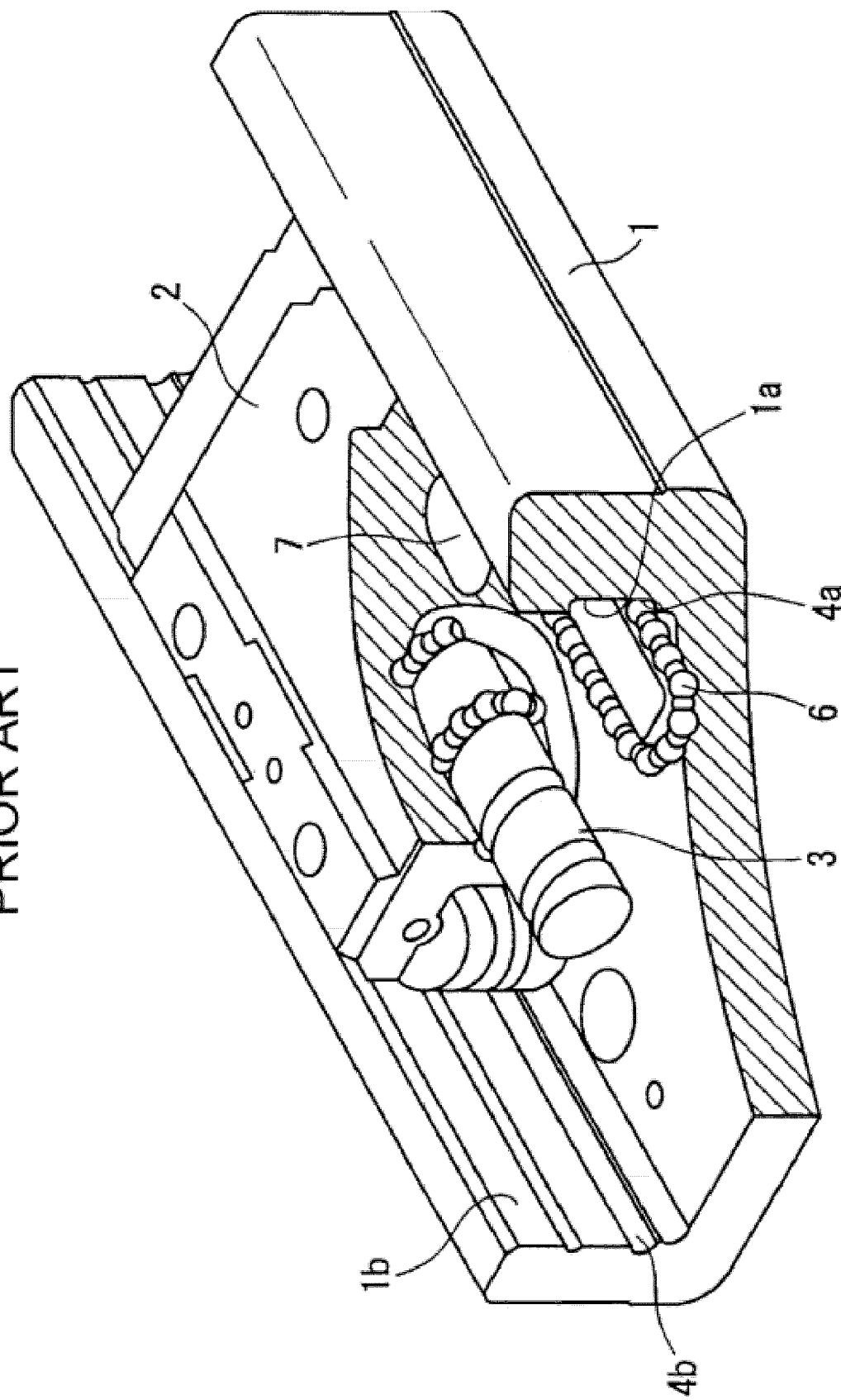
FIG. 12 shows a partial cutout perspective view illustrating an actuator according to a conventional technique.

On the other hand, as shown in FIGS. 9 and 11, a wide-width section 228, which extends in a widthwise direction substantially perpendicular to the axis of the frame 14, is formed underneath the driven pulley 54 at the other end of the pulley holder 210. Bent sections 230, which are bent toward the center of the pulley holder 210, are formed at both ends of the wide-width section 228 (see FIG. 11). The pair of bent sections 230, which have a curved shape, engage with the first ball-rolling grooves 90 of the first guide rails 42a, 42b respectively.

Specifically, the outer wall surface of the bent section 230 has a substantially circular arc-shaped cross section, wherein the outer wall surface of the bent section 230 corresponds to the cross-sectional shape of the first ball-rolling groove 90, which comprises a circular arc-shaped recess. Therefore, the bent section 230 engages satisfactorily with the first ball-rolling groove 90.

That is, the pulley holder 210 engages with the first guide rails 42a, 42b installed in the frame 14 by the aid of the wide-width section 228. Therefore, lateral displacement of the pulley holder 210 is prevented in a direction substantially perpendicular to the axis of the frame 14. Accordingly, the pulley holder 210 is held in a state such that the pulley holder 210 is displaceable only in the axial direction (in the directions of the arrows X1, X2) of the frame 14 (i.e., along the first guide rails 42a, 42b and the spring guide 218) in accordance with the repulsive force of the coil spring 204.

As described above, the pulley holder 210, which rotatably retains the driven pulley 54, is provided displaceably in only the axial direction (in the directions of the arrows X1, X2), thereby serving as the tension-adjusting mechanism 206 of the actuator 200. Further, the driven pulley 54 is continuously urged in the direction away from the driving pulley 48 (in the direction of the arrow X1) due to the coil spring 204 interposed between the pulley holder 210 and the retaining bracket 208 fixed to the second housing 26.

When the repulsive force (spring constant) of the coil spring 204 is set beforehand, so that the belt member 56 is placed under tension by aid of the coil spring 204, the driven pulley 54 is slightly displaced in a direction away from the driving pulley 48 by the repulsive force. Thus, the tension of the belt member 56 is automatically adjusted to maintain a preset optimum value, even when the tension of the belt member 56 could be lowered by other factors, for example, due to elongation of the belt member 56.

As a result, complicated maintenance operations, which hitherto have been performed by an operator for adjusting tension of the belt member 56, such as visually observing the belt member 56 or measuring the tension of the belt member 56 depending on the situation of use of the belt member 56, can be dispensed with.

Further, when the retaining bracket 208 and pulley holder 210, which constitute the tension-adjusting mechanism 206, are manufactured by pressing a thin plate member composed of, for example, a metal material, then the tension-adjusting mechanism 206 can be produced inexpensively, thereby reducing production costs.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. An actuator comprising:
    a frame;
    a driving source provided at one end of said frame;
    a driving force-transmitting mechanism comprising a driving pulley connected to and rotatably supported by a drive shaft of said driving source, a driven pulley rotatably supported at the other end of said frame, and a belt member which runs over said driving pulley and said driven pulley;
    a slider to which a driving force is transmitted by said driving force-transmitting mechanism under a driving action of said driving source, said slider being displaced reciprocally in an axial direction of said frame;
    a guide mechanism including a pair of first guide rails installed in said axial direction to inner wall surfaces of said frame, a pair of second guide rails installed in said axial direction to side surfaces of said slider opposed to said frame, and a plurality of balls which roll along ball-rolling grooves formed in said first and second guide rails respectively, for guiding said slider when said slider is displaced along said frame; and
    a tension-adjusting mechanism for adjusting a tension of said belt member, said tension-adjusting mechanism comprising a pulley holder which rotatably retains said driven pulley, said pulley holder comprising a plate member, which extends in a widthwise dimension of said frame and opposes said first guide rails, and wherein respective ends of said plate member engage with ball-rolling grooves formed in said first guide rails,
    wherein said first and second guide rails are formed of a hardened metal material subjected to a hardening treatment separately from said frame and said slider and thereafter said first and second guide rails are installed in said frame and said slider, and
    wherein said frame and said slider are formed of a non-hardened light metal material or a resin material having a weight lighter than that of said hardened metal material.

2. The actuator according to claim 1, wherein said frame and said slider are formed of a non-hardened aluminum alloy or a carbon fiber reinforced resin material.

3. The actuator according to claim 1, wherein said driving pulley and said driven pulley are provided directly on said frame respectively.

4. An actuator comprising:

a frame;

a driving source provided at an end of said frame;

a driving force-transmitting mechanism comprising a driving pulley connected to and rotatably supported by a drive shaft of said driving source, a driven pulley rotatably supported at the other end of said frame, and a belt member which runs over said driving pulley and said driven pulley;

a slider to which a driving force is transmitted by said driving force-transmitting mechanism under a driving action of said driving source, said slider being displaced reciprocally in an axial direction of said frame;

a guide mechanism including a pair of guide rails installed in said axial direction to inner wall surfaces of said frame, and a plurality of balls which roll along ball-rolling grooves formed in said guide rails and in side surfaces of said slider opposed to said guide rails, for guiding said slider when said slider is displaced along said frame; and a tension-adjusting mechanism for adjusting a tension of said belt member, said tension-adjusting mechanism comprising a pulley holder which rotatably retains said driven pulley, said pulley holder comprising a plate member, which extends in a widthwise dimension of said frame and opposes said guide rails, and wherein respective ends of said plate member engage with ball-rolling grooves formed in said guide rails, wherein said guide rails are formed of a hardened metal material subjected to a hardening treatment separately from said frame and thereafter said guide rails are installed in said frame, and wherein said frame is formed of a non-hardened light metal material or a resin material having a weight lighter than that of said hardened metal material.

5. The actuator according to claim 4, wherein said frame is formed of a non-hardened aluminum alloy or a carbon fiber reinforced resin material.

6. An actuator comprising:

a frame;

guide rails installed in said frame;

a first unit connected to one end of said frame, said first unit comprising a rotary driving source driven by an electric signal and a driving pulley connected to said rotary driving source;

a second unit connected to the other end of said frame, said second unit comprising a driven pulley, wherein a belt member runs over said driven pulley and said driving pulley of said first unit;

a tension-adjusting mechanism for adjusting a tension of said belt member, said tension-adjusting mechanism comprising a pulley holder which rotatably retains said driven pulley, said pulley holder comprising a plate member, which extends in a widthwise dimension of said frame and opposes said guide rails, and wherein respective ends of said plate member engage with ball-rolling grooves formed in said guide rails; and a slider connected to said belt member, said slider being displaceable along said frame under a driving action of said rotary driving source, wherein said first unit and said second unit are integrally assembled to said frame.

7. The actuator according to claim 6, wherein stoppers are provided on each of said first unit and said second unit, said stoppers abutting against end surfaces on respective sides of said slider when said slider is displaced in an axial direction of said frame.

8. The actuator according to claim 6, wherein a pair of cover members are installed on said first unit and said second unit, said cover members being separated from each other by a predetermined spacing distance in a direction substantially perpendicular to an axis of said frame and covering parts of upper surfaces and side surfaces of said first unit and said second unit.

9. The actuator according to claim 6, wherein said plate member comprises bent sections formed at said respective ends thereof, said bent sections being bent in a circular arc-shape so that said bent sections correspond to a shape of said ball-rolling grooves, and wherein said bent sections engage respectively with said ball-rolling grooves.

10. The actuator according to claim 6, wherein said tension-adjusting mechanism comprises:

a retaining bracket which retains said pulley holder while permitting displacement of said pulley holder in an axial direction of said frame; and a spring member interposed between said retaining bracket and said pulley holder for urging said pulley holder to approach said retaining bracket.

11. The actuator according to claim 10, wherein said tension-adjusting mechanism maintains a constant tension of said belt member while said belt member runs over said driving pulley and said driven pulley by displacing said pulley holder toward said retaining bracket in accordance with a repulsive force of said spring member.

12. The actuator according to claim 10, wherein said retaining bracket is fixed to a body of said second unit, said body being provided with a spring guide that protrudes toward said driven pulley and retains said spring member compressed in said axial direction.

13. The actuator according to claim 10, wherein said driven pulley is rotatably retained by said pulley holder and a pair of bearings.

14. The actuator according to claim 10, wherein said pulley holder is formed by pressing said plate member and said retaining bracket is formed by pressing another plate member.

15. The actuator according to claim 10, wherein a repulsive force of said spring member is set so that said repulsive force is balanced with said tension when said tension of said belt member is adjusted.

* * * * *